(12) United States Patent
Deuber

(10) Patent No.: US 10,039,410 B2
(45) Date of Patent: Aug. 7, 2018

(54) SYSTEM FOR BREWING COFFEE

(71) Applicant: Qbo Coffee GmbH, Wallisellen (CH)

(72) Inventor: Louis Deuber, Richterswil (CH)

(73) Assignee: QBO COFFEE GMBH, Wallisellen (CH)

( * ) Notice: Subject to any disclaimer, the term of this patent is extended or adjusted under 35 U.S.C. 154(b) by 0 days.

(21) Appl. No.: 15/163,855

(22) Filed: May 25, 2016

(65) Prior Publication Data

US 2016/0262566 A1 Sep. 15, 2016

Related U.S. Application Data

(62) Division of application No. 13/263,895, filed as application No. PCT/CH2010/000097 on Apr. 13, 2010, now Pat. No. 9,375,111.

(30) Foreign Application Priority Data

Apr. 15, 2009 (EP) .................................. 09405065

(51) Int. Cl.
*A47J 31/06* (2006.01)
*A47J 31/36* (2006.01)
*B65B 29/02* (2006.01)
*B65B 51/22* (2006.01)
*B65B 9/04* (2006.01)
*A47J 31/40* (2006.01)
*B65D 85/804* (2006.01)

(52) U.S. Cl.
CPC ....... *A47J 31/3695* (2013.01); *A47J 31/3623* (2013.01); *A47J 31/407* (2013.01); *B65B 9/042* (2013.01); *B65B 29/02* (2013.01); *B65B 29/022* (2017.08); *B65B 51/225* (2013.01); *B65D 85/8043* (2013.01)

(58) Field of Classification Search
CPC ................ A47J 31/3623; A47J 31/3628; A47J 31/3666; A47J 31/3676; A47J 31/368; A47J 31/369; A47J 31/3695; A47J 31/407; B65B 9/042; B65B 29/02; B65B 51/225; B65D 85/8043
See application file for complete search history.

(56) References Cited

U.S. PATENT DOCUMENTS 2,736,656 A * 2/1956 Marshall ................. B65B 9/042
206/484
3,095,801 A * 7/1963 Fogg ...................... A47J 31/053
99/312
3,698,624 A 10/1972 Stark
(Continued)

FOREIGN PATENT DOCUMENTS

DE 102005020718 8/2006
EP 1510459 3/2005
(Continued)

*Primary Examiner* — Dana Ross
*Assistant Examiner* — Brandon Harvey
(74) *Attorney, Agent, or Firm* — Rankin, Hill & Clark LLP

(57) ABSTRACT

A capsule to form a closed interior filled with an extraction product or extract can be perforated in a known manner by perforation elements of an injection device or a discharge device in order to introduce an extraction liquid and to discharge an extraction product produced in the interior of the capsule following an extraction process. The capsule has the shape of a cuboid or a die.

6 Claims, 5 Drawing Sheets

(56) References Cited

U.S. PATENT DOCUMENTS

| | | | |
|---|---|---|---|
| 3,787,257 A | 1/1974 | Akerlund | |
| 2003/0056661 A1 | 3/2003 | Hu et al. | |
| 2003/0217644 A1 | 11/2003 | Jarisch et al. | |
| 2004/0182250 A1* | 9/2004 | Halliday | A47J 31/4407 99/279 |
| 2007/0289453 A1 | 12/2007 | Halliday et al. | |
| 2014/0069281 A1 | 3/2014 | Ryser et al. | |

FOREIGN PATENT DOCUMENTS

| | | | |
|---|---|---|---|
| EP | 1580143 | 9/2005 | |
| EP | 1580144 | 9/2005 | |
| EP | 1775234 | 4/2007 | |
| EP | 1886942 | 2/2008 | |
| EP | 1 972 575 | 9/2008 | |
| EP | 1997748 | 12/2008 | |
| FR | 2908970 | 5/2008 | |
| GB | 271124 | 5/1927 | |
| JP | 61-25682 | 2/1986 | |
| JP | H08150080 | 6/1996 | |
| JP | 2007-506474 | 3/2007 | |
| WO | 2004/026091 | 4/2004 | |
| WO | 2008/041262 | 4/2008 | |
| WO | WO 2008041262 A1 * | 4/2008 | B65D 85/8043 |
| WO | WO 2008096385 A1 * | 8/2008 | A47J 31/3628 |
| WO | 2008/111072 | 9/2008 | |

* cited by examiner

SYSTEM FOR BREWING COFFEE

BACKGROUND OF THE INVENTION

Field of the Invention

The invention relates to the preparation of beverages or the like from an extraction material contained in a capsule, for example ground coffee. It relates in particular to a pierceable capsule as a portion pack and to a method for the production thereof.

Description of Related Art

Extraction devices for preparing beverages or the like from an extraction material present in a portion pack are known, for example, as coffee or espresso machines and continue to enjoy increasing popularity. In many corresponding systems, the portion packs are formed as capsules in which the extraction material is, for example, closed off in an airtight manner. For the extraction, the capsule is pierced from two opposite sides. On the first side, extraction liquid—generally hot water—is introduced. On the second side, the extraction product is discharged from the capsule. Depending on the beverage to be prepared and the system, a considerable pressure, for example of 5-20 bar, may thereby prevail in the interior of the capsule.

Such capsules must not be confused with—and have to meet entirely different requirements than—portion packs of filter coffee, which are opened by pulling off a foil, removing a cover or the like and are not at any time exposed to an increased pressure. They are equally not comparable to the outer, aroma-tight packagings of "filter pads". In brewing modules of coffee machines, capsules of the type described here are often passed through horizontally or vertically by the hot brewing liquid and, as mentioned, are thereby exposed to a considerable pressure inside. This also gives rise to the problem of sealing; after all, the pressurized brewing liquid must not get past the capsule and enter the discharge device directly.

Aluminum and plastics, for example polypropylene, have become known in particular as capsule materials. Aluminum capsules keep the extraction material fresh for a long time, but use considerable energy for their production. Polypropylene capsules are advantageous with respect to energy consumption and disposal, but impose increased requirements on the piercing mechanism.

Particularly advantageous with respect to material consumption are deep drawn capsules, which however always have a decidedly conical form.

Available on the market are both, capsules with integrated filtering means and capsules that merely comprise a shell around the extraction material, and for which the piercing mechanism therefore has to be designed in such a way that extraction material is not undesirably discharged from the capsule together with the extraction product.

An example of a capsule without integrated filtering means is disclosed for example in EP 1 886 942.

Available capsules are generally rotationally symmetrical and comprise a peripheral collar, which has a threefold function essential for them to work properly:

the collar serves for closing the capsule during the filling operation, in that it comprises an energy director for ultrasonic welding at a sufficient distance from the interior space of the capsule or a sufficiently large surface area for thermal welding;

the collar serves for holding the capsule before the brewing operation;

the collar is essential for the sealing during the brewing operation, as it ensures that no brewing liquid gets past the capsule and directly enters the discharge device.

In the case of capsules according to the prior art, an additional sealing function may be assumed by the conical form, which fits very exactly into a corresponding receptacle of the brewing chamber.

Many of the available capsules are shaped in the form of a cup, i.e. they are rotationally symmetrical about an axis and conical. Often, the cover of the cup-shaped capsule is of a different material composition than the actual cup that forms the lateral surface and the bottom surface. Therein, the injection of the extraction liquid takes place through the cover or the bottom surface and the discharge of the extraction product correspondingly takes place through the bottom surface or the cover respectively. This form of capsule has proven successful, both with regard to the mechanical stability and with regard to technical aspects of production.

A particularly problematical issue involves the swirling of the extraction material during the brewing process. During the extraction process, liquid flows through the capsule at high speed. If there is limited compaction of the extraction material, it is made to swirl considerably during the brewing process. For this reason, it has already been proposed (EP 1 886 942) that the extraction material is compressed vigorously during the capsule filling process. However, this method is rather complex, and the pellet-like consistency of the extraction material achieved by the compression can be lost during the transportation of the capsule.

A further problematical issue that is often discussed in connection with portion capsules for brewed beverages is the complex packaging, which adversely affects the energy balance.

SUMMARY OF THE INVENTION

It is an object of the invention to provide a capsule for a brewed beverage or the like that overcomes disadvantages of the prior art and brings improved solutions in terms of the energy balance and flexibility.

This object is achieved by the invention as it is defined in the patent claims.

The portion capsule according to the invention is of the type mentioned at the beginning, in which the extraction material is, for example, closed off in an airtight manner and which anticipates obtaining extraction by piercing the capsule on two opposite sides. On the first side, an extraction liquid—generally hot water—is introduced. On the second side, the extraction product is discharged from the capsule. Depending on the beverage to be prepared and the system, the capsule must thereby withstand a considerable pressure inside it, for example of 5-20 bar, in particular, more than 10 bar. However, this does not preclude the use of the capsule in brewing processes with a lower pressure, for example of only 1-2 bar—in particular for filter coffee of the American style.

The capsule is free from sieving or supporting elements or the like arranged in the interior; it therefore consists, for example, only of a capsule wall of uniform wall thickness, at least on several sides, and the capsule filling (extraction material).

According to one aspect of the invention, the capsule is in the form of a cube or cuboid and is free from protruding collars or the like.

In the present case, cuboidal or cube-shaped describes a form that does not deviate from the geometrically exact form of a cuboid or cube to such an extent that it would be functionally very different; for example, it includes the form of a truncated pyramid with a rectangular or square base area, wherein the side faces adjoining the base area are inclined with respect to the perpendicular to the base area by only a small angle of inclination a of, for example, at most 3° or 2°, preferably at most about 1°. As mentioned, the cuboid or cube form excludes a peripheral collar that protrudes from the capsule body in the plane of an end face and is provided for holding the capsule in guiding slots. The cuboidal or cube-shaped capsule may nevertheless comprise peripheral edges created during production (for example a welding bead), which laterally protrude, for example, by a maximum of 1.5 mm or 1 mm, 0.8 mm, 0.6 mm, with particular preference 0.5 mm or less, as a result of their limited dimensions do not significantly impair the function of the cube or cuboidal shape and are also, for example, offset from a plane of an end face.

This form firstly has the great advantage that the extraction material can be compressed from various sides, which is not the case with the cup-shaped capsules. In particular, the extraction material can also be compressed when it is already packed in the capsule—by pressing two opposite side walls toward each other. In the case of cup-shaped capsules, that is not readily possible in a nondestructive manner. With preference, the capsule is formed such that a deformation of two opposite side walls (or of central points on these side walls) against an elastic force with a volume-reducing effect is possible. This refers to the state at room temperature and does not preclude a permanent deformation of a plastic capsule wall in the hot state.

Secondly, there is the advantage of the decidedly improved packability. The filled and sealed capsules can be arranged in series one against the other and stacked one on top of the other in such a way as to obtain a stack that is essentially free from intermediate spaces, can also be provided with a pleasing appearance—for example as a cube—and nevertheless manages with minimal external packaging.

With preference, the capsule can be pierced from every side—that is, every pair of sides lying opposite from each other. This means here not only that the capsule wall on the side of the cube concerned can be perforated by a corresponding metal tip, but also that the capsule pierced on a pair of opposite sides of the capsule withstands the brewing pressure when the liquid is introduced and the brewing liquid only flows away on the extraction side and only at the location of the perforations.

The capsule is closed off in a hermetic and oxygen-tight manner by the wall comprising all sides, edges and corners. Therefore, no separate foil that entirely or partially covers the capsule and no oxygen-tight bag or the like for the capsule is necessary. In comparison with known systems, the amount of waste is much less.

With preference, the capsule consists of essentially the same material composition on all sides. In particular, the capsule may also be of essentially the same thickness on all sides. In other words, no special cover foil configured differently than the basic body is necessary. "Essentially the same thickness" may mean, for example, that the thicknesses of the various sides differ by at most 30%.

The cube form is particularly advantageous. In the case of a configuration with the same material composition and thickness on all sides, it is immaterial how the cube-shaped capsule is placed into a brewing module of the extraction device (coffee machine or the like). This reduces the risk of incorrect manipulations by the user.

The capsule preferably consists of plastic. An especially preferred material for the capsule is polypropylene (PP). Other materials are also conceivable, in particular other plastics that are compatible with food. The wall thickness in the design of a plastic capsule is preferably between 0.1 mm and 0.5 mm, for example between 0.2 mm and 0.4 mm, in particular between 0.25 mm and 0.35 mm.

In designing a plastic capsule, the capsule is preferably produced by deforming (for example deep drawing) a sheet of plastic. This makes it possible for a greatly reduced amount of material in comparison with other processes—for example injection molding—to be required. The sheet of plastic may contain an oxygen barrier layer in a way known per se. Previous deep drawn plastic capsules have always been conical, because conical forms are in accord with the deep drawing process. In this respect, the present invention (or embodiments thereof) takes an entirely new approach, in that a form deviating from the conical is chosen, a form which, as mentioned above, proves to be highly advantageous. To this purpose, a deep drawing tool with special properties developed specifically for such applications is used.

According to a preferred embodiment of the invention, the capsule is provided together with a coffee machine or a brewing module of a coffee machine which comprises the following:
  a first brewing module part, and
  a second brewing module part, which is movable in relation to the first part, wherein the first and the second brewing module part form a discharge device for discharging an extraction product from the capsule and an injector for introducing an extraction liquid into the capsule and a brewing chamber formed to match the shape of the capsule and at least partially surrounding the capsule during the brewing operation, wherein the discharge device and the injector each comprise at least one perforating tip, which perforates the capsule when the brewing chamber is being closed, wherein
  the brewing is made to match the afore described shape of the capsule and acts in a sealing manner in such a way that brewing liquid introduced into the capsule by the injector can only reach the side where the discharge device is located by passing through the capsule.

In other words, this approach abandons a peripheral collar that assumes the sealing function and instead provides a brewing chamber that receives substantially cube-shaped capsules and nevertheless comprises means which bring the brewing liquid under pressure through the capsule.

According to a further preferred embodiment, the brewing module is free from holding grooves or the like for holding a collar—not present according to the invention —, but instead the capsule is thrown directly into the brewing chamber. This means, for example, that the first brewing module part forms a capsule receptacle with a contact surface and a lateral guide, the contact surface being positioned in such a way that the capsule thrown in via the throwing-in position comes to lie on the contact surface, guided by the lateral guide, that the second brewing module part can be moved in relation to the first brewing module part for closing the brewing chamber, and that the contact surface and the lateral guide form part of the wall of the brewing chamber.

Likewise with preference, the brewing module comprises a compression means, by which the capsule is compressed, for example from two lateral sides, which results in improved extraction. The compression means may comprise, for example, two pins which can be displaced counter to a spring force into the capsule space and are displaced by a guiding cam during the closing of the brewing chamber.

A preferred method for producing the capsule proceeds as follows: firstly, a basic cube body which has five sides and is open on the other side (or correspondingly other basic polyhedral bodies) is produced from a suitable plastic. This may take place in a packaging production factory and by the deep drawing process. Then, the open basic body is filled with the extraction material in a filling plant. Subsequently, the missing side is fastened to the open basic body as a cover, the cover preferably comprising the same material composition and being of the same thickness as the basic body.

According to a first possibility, the fastening is performed along the peripheral edge of the basic body, for example by ultrasonic welding, thermal welding or by adhesive bonding. For this purpose, the basic body may initially have a collar which runs around the open side, protrudes inwardly or outwardly and to which the cover is welded or adhesively bonded. In the case of fastening by means of ultrasonic welding, the collar may also be provided with an energy director. As a difference from known solutions, the energy director may in this case not be arranged as far to the outside as possible but in the vicinity of the inner side. For example, the distance d between the one edge of the energy director and the plane defined by the inner wall of the capsule may be no more than 0.7 mm, with preference no more than 0.6 mm, 0.5 mm or 0.4 mm, and, for example, be in the range between 0.2 mm and 0.4 mm. If—as is preferred—the collar protrudes outwardly, the cover may be somewhat larger than the open side of the basic body and, for example, protrudes more or less as far as the outer edge of the collar. After the welding, the peripheral edge may optionally be at least partially detached, for example by punching, in order that at most there are minor deviations from the form of the cube (the corresponding other polyhedron).

According to a second possibility, the basic body likewise initially has a peripheral, outwardly protruding collar. The cover may be flat or—with preference—outwardly curved. Then, the ultrasonic cut and seal process is used, in which ultrasonic energy is absorbed between a sonotrode and a cutting anvil, with the effect on the one hand of producing comparatively deep welding, which also has great pressure resistance, and on the other hand of detaching the protruding collar in the welding operation itself.

BRIEF DESCRIPTION OF THE DRAWINGS

Exemplary embodiments of the invention are described below on the basis of drawings. In the drawings, the same reference signs designate the same or analogous elements. The drawings are not to scale and to some extent show elements partly corresponding to one another in different sizes from figure to figure. In the drawings.

DETAILED DESCRIPTION OF THE INVENTION

Figure 1:
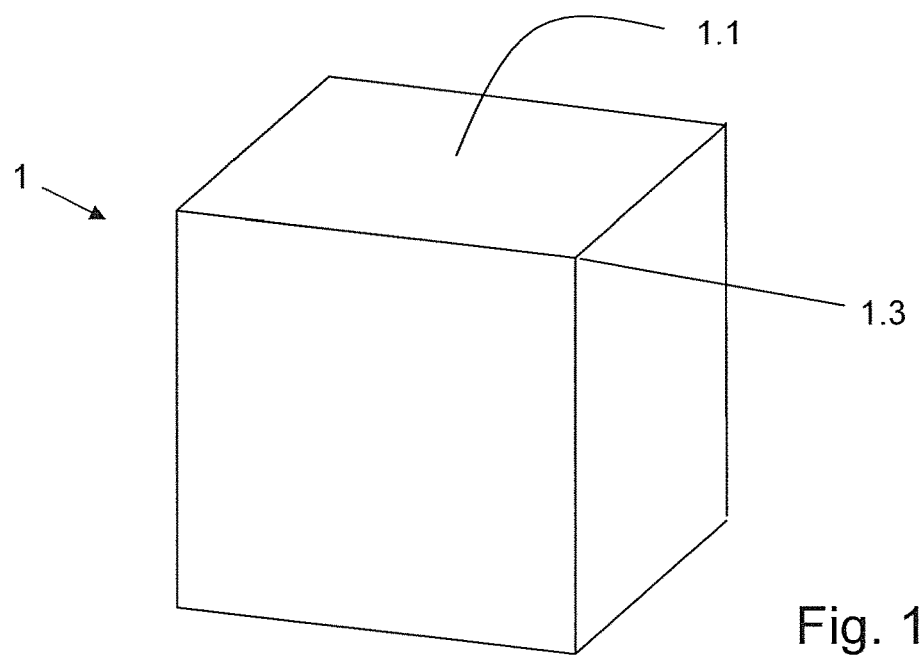
FIG. 1 shows a view of a capsule.

The capsule 1 according to FIG. 1 is cube-shaped and consists of polypropylene with a wall thickness of between 0.1 mm and 0.5 mm, preferably between 0.2 mm and 0.4 mm, for example between 0.25 mm and 0.35 mm.

For individual portions for coffee to suit continental European drinking tastes, the outer length of the edges of the cube 1.2 is with preference between 24 and 30 mm, for example between 26 and 27 mm. An outer edge length of 27.5 mm results in a maximum filling weight of about 8.5 g of coffee. However, the capsule size of individual portion capsules may also have other dimensions, for example to suit American coffee drinking tastes. There, the capsules may have an outer edge length of, for example, up to 34 mm, in particular for example about 32 mm, for a filling amount of about 14-15 g. For such drinking tastes, the pressure of the water introduced may also be correspondingly chosen differently, and for example be only about 1-2 bar instead of the otherwise preferred 10-18 bar.

Altogether, a preferred range of the edge lengths is between 24 mm and 34 mm.

For introducing the extraction liquid and discharging the extraction product, the capsule may be pierced from all six sides 1.1, all twelve edges 1.2 and all eight corners 1.3, the introduction and discharge taking place with preference on/at sides/edges/corners which are opposite from each other.

Figure 2:
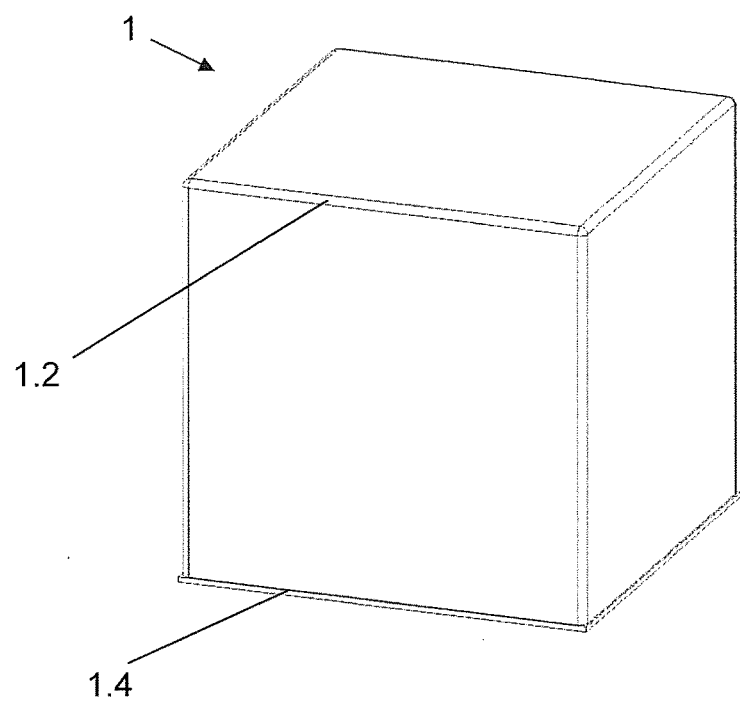
FIG. 2 shows a view of a variant of the capsule from FIG. 1.
Figure 3:
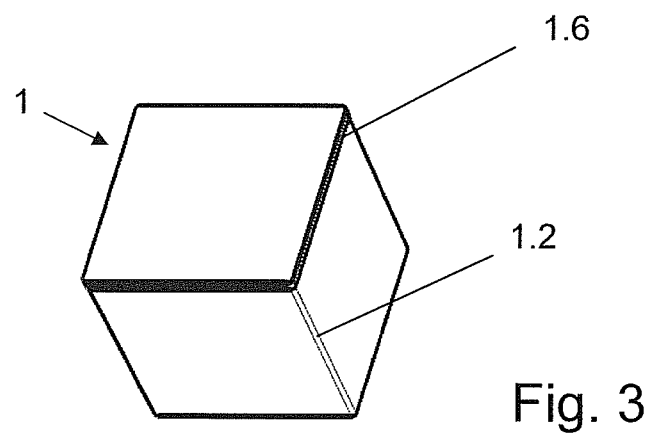
FIG. 3 shows a view of a further variant of the capsule from FIG. 1,
FIG. 4 schematically shows an approximately cube-shaped, slightly frustopyramidal capsule.

In the representation according to FIG. 2 it can be seen that a cube-shaped capsule may have edges which are formed as rounded-off edges 1.2. Furthermore, there is a collar 1.4, which in FIG. 2 lies on the underside, runs around the periphery, slightly protrudes laterally and is created during production, which is explained in further detail below. As FIG. 3 shows, there may also be a peripheral reinforcement 1.6, which is likewise created during production.

Figure 4:
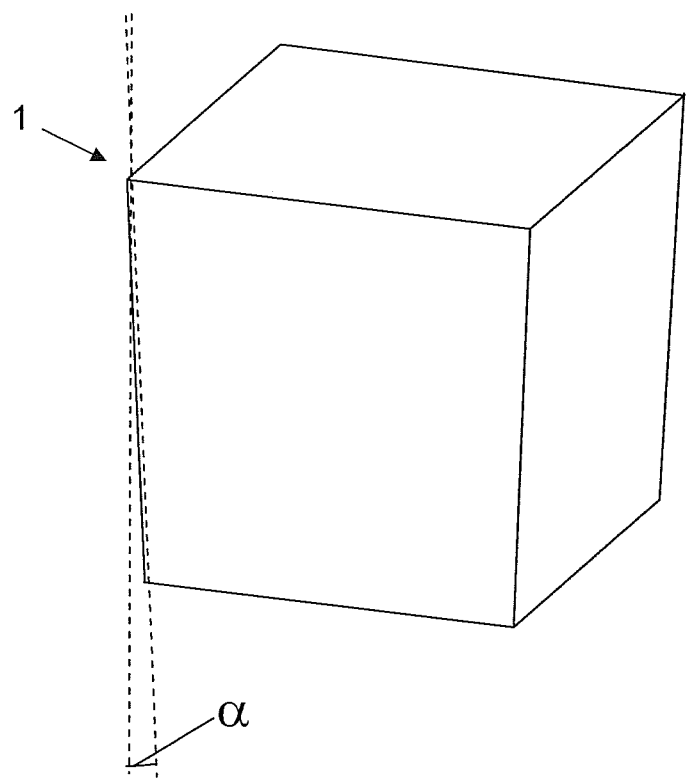

The capsule 1 according to FIG. 4 is likewise approximately cube-shaped. However, the side 1.1 lying on top in the figure is somewhat larger than the underside, so that, strictly from a mathematical viewpoint, the capsule has the form of a truncated pyramid. The angle of inclination a of the side faces in the figure with respect to the perpendicular to the base area—meaning of course the plane perpendicular to the base area extending through the edge between the base area and the corresponding side face—is very small; it is preferably at most 2°, for example only about 1°. Furthermore, the height of the capsule above the base area corresponds approximately to the length of the edges of the base area, and for example deviates by at most 5% therefrom.

Figure 5:
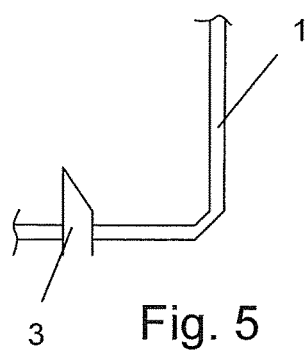
FIG. 5 shows piercing via one side of the capsule.

FIG. 5 shows very schematically the piercing of a side wall of the capsule with a perforating element 3. Perforating elements for piercing the capsule for the purpose of introducing or discharging liquid are known and are also continuing to be developed. In principle, the capsule according to the invention is suitable for any kind of perforating mechanisms that have been developed for piercing the chosen capsule material with the chosen wall thickness, that is to say the specific form of the capsule according to the invention does not give rise to any other requirements for the piercing mechanism than in the case of other forms. Preferred, however, are arrangements in which a number of distributed perforating elements are present on the injector side and in particular on the extraction side, and there is not just a centrally provided perforating element.

Figure 6:
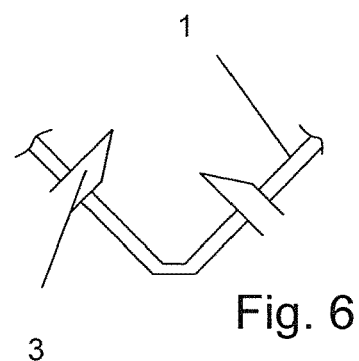
FIG. 6 shows piercing via an edge or corner of the capsule.

FIG. 6 shows a corresponding arrangement for piercing a capsule 1 from an edge. The arrangement has two perforating elements assigned to each other in the direct vicinity of the edge, which perforate the sides adjoining the edge in order that a liquid can be introduced or discharged. Further pairs of perforating elements may be arranged along the length of the edge, or the two sides adjacent the edge may be assigned a different number of perforating elements. Piercing the capsule from the corner is also conceivable, there then preferably being at least three perforating elements, one for each side of the capsule adjoining the corner.

The corresponding arrangement of perforating elements for discharging or introducing purposes is preferably present on/at the opposite side/edge/corner, asymmetric arrangements (introducing via an edge, discharging via a side face or the like) also being conceivable in principle.

Figure 7:
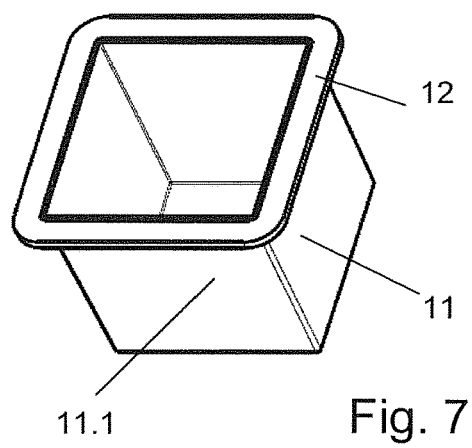
FIG. 7 shows a basic body with an auxiliary collar for producing a capsule according to the invention.

A method for producing a capsule of the type described above is discussed below on the basis of FIGS. 7 and 8, the method corresponding to the first possibility mentioned. FIG. 7 shows a cube-shaped body 11 open on one side, as can be produced, for example, by thermoforming. The side walls 11.1 adjacent the opening, which lies at the top in the figure, are inclined very slightly—by 1°—from the perpendicular to the side wall opposite the opening ('bottom'), to be precise such that the opening is somewhat larger than the area of the bottom measured on the inner side. This optional feature has the effect that the cube-shaped body can be stacked in a space-saving manner in the non-filled state. According to the invention, there is also the possibility of omitting this slight inclination, in order to obtain an exactly cube-shaped capsule; in this case, the non-filled, open cube-shaped bodies can no longer be stacked well, and are for example advantageously transported as bulk material.

In the region of the opening, a peripheral collar 12 is provided on the outside of the open cube-shaped body and may protrude laterally quite decidedly. As the detailed representation according to FIG. 8 reveals, this collar 12 has a ridge 11.5, which is directed upwardly (that is in the direction of the open side) and has an upper edge (corresponding to a point in the cross-sectional representation).

The collar 12 with the ridge 11.5 serves as an aid in the fastening of the cover 13 by means of ultrasonic welding. For this purpose, the cover 13 is put in place in the way illustrated in FIG. 8. Subsequently, a sonotrode of an ultrasonic welding device is pressed from above (with reference to the orientation depicted in FIG. 8) against the cover and ultrasonic vibrations are coupled into the latter. The collar 12 serves in this case firstly for applying an opposing force: before being subjected to ultrasonic vibrations, the body 11 filled with the extraction material is placed on a contact surface 15, such that it protrudes into a square opening, shaped in a way corresponding to the cross section of the body, and contact surfaces with the collar 12 against the edge of this opening. As a result, the body is fixed during the ultrasonic welding, and the necessary opposing force can be applied independently of the stability of the body 11. The ridge 11.5 serves as an energy director during the ultrasonic welding operation. In the region of the ridge, ultrasonic energy is primarily converted into heat, so that the material of the cover 13 and the material of the body 11 begin to melt in the vicinity thereof and are thus welded to each other. Instead of a ridge 11.5, or in addition thereto, the collar may also have other structures acting as energy directors, for example a plurality of tips, etc.

Following the ultrasonic welding operation, the collar may be removed by punching. This produces the cube as represented in FIG. 3, at most with an only very slightly protruding (for example by no more than 0.1 mm) remaining collar 1.4, as represented in FIG. 2.

Figure 8:
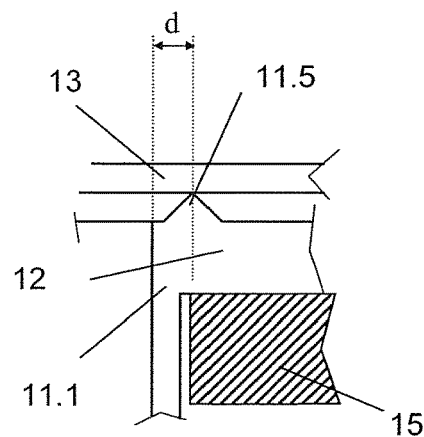
FIG. 8 shows a detail of the basic body and of a cover during the method for producing the capsule.

It is favorable for this purpose if—as represented in FIG. 8—the energy director (here: ridge 11.5) does not lie as far outside as possible on the collar, as known from the prior art, but on the inner side, in the vicinity of the inner wall of the body 11, since during the punching-off operation the punching tool should preferably make contact outside the location at which the energy director was before the welding. For example, the distance d between the edge formed by the ridge 11.5 and the inner wall is no more than 0.7 mm, with particular preference even less, for example as a maximum 0.6 mm, 0.5 mm or 0.4 mm, and for example between 0.25 mm and 0.4 mm.

Figure 9:
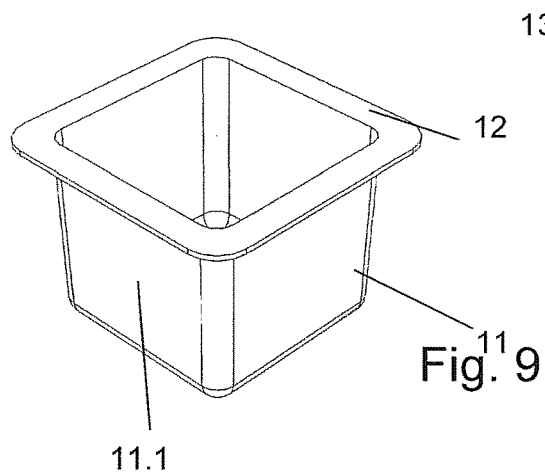
FIGS. 9 and 10 show a basic body and a cover for an alternative method for producing a capsule according to the invention.
Figure 10:
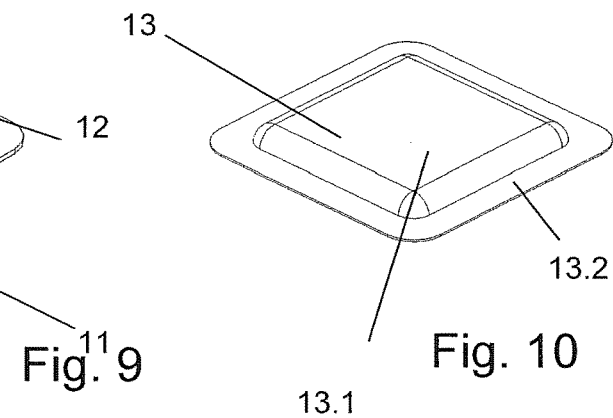

Variants of the capsule body 11 (with a slight conicity shown somewhat exaggerated) and of the cover, as can be used for a production method according to the second possibility (with the ultrasonic cut and seal process) are represented in FIGS. 9 and 10. A collar 12 of the capsule body and a collar 13.2 of the cover are placed one on the other in an anvil and then detached by the ultrasonic cut and seal process, resulting in the cube-shaped capsule with a very slightly protruding welding bead. As a difference from the embodiment described above, the capsule body has a slightly smaller height in comparison with the width of the side walls, and the cover is outwardly curved (the curvature of the cover inner portion 13.1 can be seen very well in the figure) to make up the missing cube height. As a result, the welding bead is offset slightly from the upper end face, i.e. offset downwardly.

Figure 11:
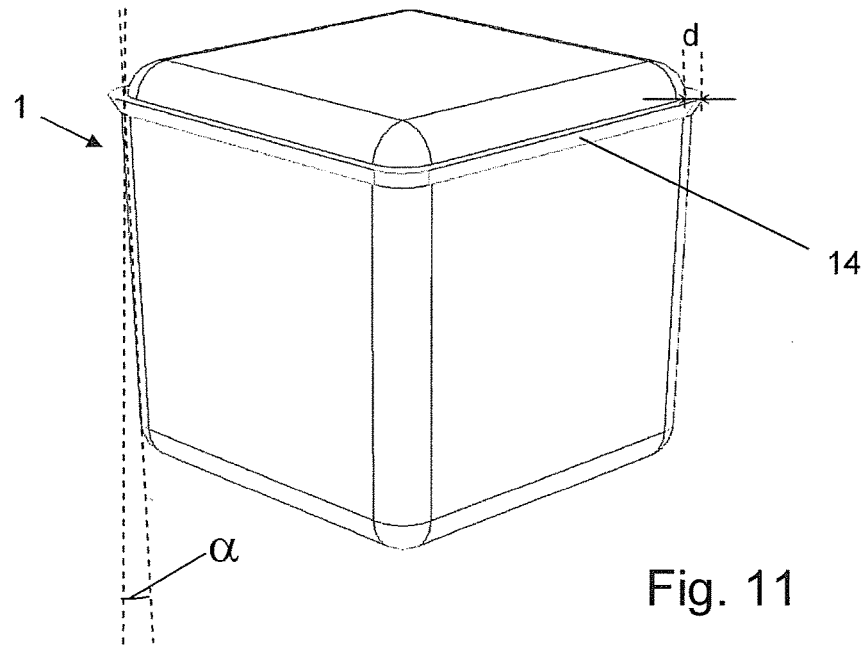
FIG. 11 shows a view of a capsule produced by the method according to FIGS. 9 and 10, and
FIGS. 12 and 13 show representations of a brewing module for operating together with capsules according to the invention.

FIG. 11 shows an example of a capsule 1 produced by the ultrasonic cut and seal process mentioned above. The angle α, differing slightly from 0°, of about 1° (see also FIG. 4), and the peripheral welding bead 14, which laterally protrudes on all sides by a maximum of about d=0.35 mm in the case of a cube size of 27.5×27.5×27.5 mm, that is by a maximum of about 3%, can be clearly seen. As already mentioned, the welding bead is slightly offset downwardly with respect to the upper end face.

Figure 12:
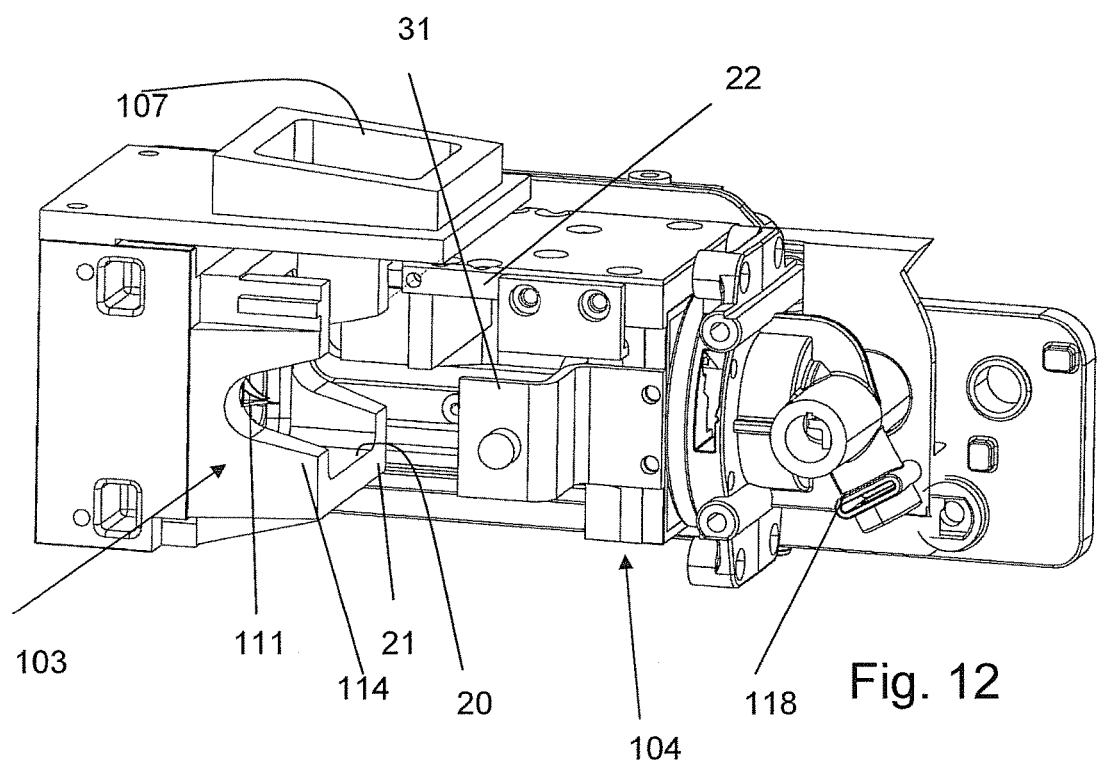
Figure 13:
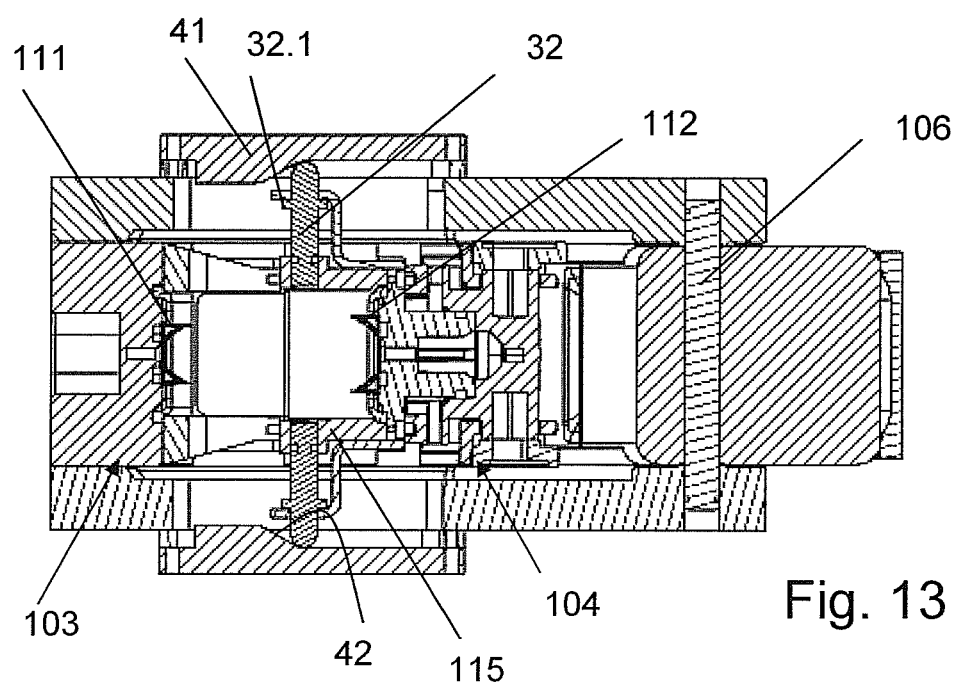

FIGS. 12 and 13 show the brewing module with the capsule 1. In a way known per se, the brewing module has, guided between a framework with two vertical guiding walls, a discharge device 103 and an injector 104, which can be displaced in relation to each other by an operating lever that can be pivoted about a pivot pin 106. In the embodiment depicted, the injector can be displaced by a pivoting movement of the operating lever in the direction of the discharge device 103, while the latter is immovable in relation to the framework.

In FIG. 12, the throwing-in opening 107 for throwing in the cubic portion capsule can be seen clearly. The throwing-in opening is formed in the framework, is located in the region of the discharge device 103 and, like the latter, remains stationary during a movement of the operating lever. The throwing-in opening may be slightly conical, tapering downward, in order to have a centering effect on the capsule when it is thrown in, without the risk of the capsule canting being too great.

In the operating state, the brewing module serves as a horizontal brewing module of a coffee machine, which apart from the brewing module comprises a water tank, a water heating device (for example a flow heater) and a pump for feeding brewing water to the injector 104. The corresponding feed channels 118 of the injector may be formed in a way known per se; they are not the subject of the invention and are not described any more specifically here. The injector also has at least one piercing tip 112 with an assigned feed opening, so that the capsule can be pierced and supplied with the extraction liquid through the feed opening. The coffee machine also has, for example, a capsule container, which is arranged underneath the brewing chamber and into which the capsule is automatically ejected after the brewing operation by lifting of the operating lever.

The discharge device 103 is also provided with at least one piercing tip 111 and an assigned discharge opening. Depending on the configuration, there is also a discharge line, by which coffee (or the like) emerging after leaving the discharge device is conducted in such a way that it runs into a cup placed at the place intended.

As can be seen particularly well in FIG. 12, the discharge device 103 forms a capsule receptacle with a contact surface 21 for the capsule thrown in through the throwing-in opening, defining the resting area 20.

Guided by the first side walls, the approximately cube-shaped capsule thrown in through the throwing-in opening when the brewing chamber is open will rest on the contact surface 21.

The injector also has on each of both sides a pressing pin 32, which is provided via a guiding plate 31 and can be displaced inwardly, counter to the spring force of a spring that is not represented in the figure but is arranged between a collar 32.1 of the pressing pin and the side wall 115, such that in a rest position it does not protrude inwardly beyond the side walls 115 and in a deflected position it protrudes inwardly beyond the side walls and into the brewing space. The collar 32.1 at the same time also forms together with the guiding plate 31 a stop for the radially outward movement of the pressing pin 32.

The operating mode of the pressing pins 32 is clearly illustrated in FIG. 13. In the side part of the brewing module, a camway 42 is integrated on each of both sides. Such a camway may be formed either in the corresponding side wall itself or, as represented, in a camway element 41 fastened to the side wall. The pressing pin 32 is pressed by the spring force outwardly against the camway 42. During the displacement of the injector 104 from the open position into the closed position, it is deflected inwardly counter to the spring force, on account of the shape of the camway. As a result, the inserted capsule is compressed on both sides; the inward deflection of the pressing pins may be, for example, between 2 and 8 mm, with preference between 3.5 and 7 mm. As a result, the coffee powder inside the capsule is compacted, in particular in a central region. This also has the result of preventing brewing liquid that flows through centrally from undergoing less resistance than brewing liquid that flows along the periphery of the capsule.

During the transition into the closed state of the brewing chamber, the capsule is also easily displaced to the side where the discharge device is located, and thereby pierced on both sides—by the piercing tips 111 of the discharge device and the piercing tips 112 of the injector.

Apart from compressing the extraction material, the pressing pins 32 also have a further function. When the brewing chamber is opened after the brewing operation, they cause the capsule to be displaced out of the capsule receptacle in the direction of the injector side in such a way that it can fall downwardly and into a capsule container (not depicted). This takes place automatically, in that during the displacement of the injector, the pressing pins 32 initially still reach into the interior of the brewing chamber and fix the capsule; this fixing is only released approximately in the position depicted in FIG. 12, in which the center of gravity of the capsule is already beyond the resting area. Depending on the degree of filling of the capsule, this effect is additionally enhanced by the extraction material often being swollen after the brewing operation, and therefore having the tendency to make the capsule walls bulge slightly outwardly.

It can likewise be seen in FIG. 13 that the piercing tips 112 on the injector side are a different distance apart than the piercing tips 111 on the discharge device side. In the example represented, the piercing tips on the injector side are arranged decidedly further outward (here at a distance apart of 19 mm) than the piercing tips on the discharge device side (here at a distance apart of 14 mm). It is generally preferred that the distances between the tips are significantly different, for example by at least 15%.

The brewing chamber is formed in such a way that, during the brewing operation, no brewing water can get past the capsule and enter the discharge device, and also that no extraction product flows anywhere other than into the discharge device.

What is claimed is:

1. A system for brewing coffee, comprising:
at least one capsule;
and a coffee machine with a brewing module;
wherein the capsule comprises a capsule wall and a capsule cover,
wherein the capsule wall encloses a closed interior space that is filled with an extraction material;
wherein the capsule wall is capable of being perforated by perforation elements of an injector or discharge device,
wherein the capsule is designed for being under positive pressure during a brewing operation, wherein the capsule wall is formed by a five-sided basic body that is open on a sixth side, and wherein the capsule cover closes off the open side of the basic body, and wherein the cover is outwardly curved, and the basic body and the cover are joined at a peripheral edge that protrudes laterally, whereby the peripheral edge between the cover and the basic body is offset from an upper end face of the capsule, wherein the capsule has the form of a cube or cuboid, with the exception of the laterally protruding peripheral edge;
and wherein the brewing module comprises
a first brewing module part, and
a second brewing module part, which is movable in relation to the first part,
wherein the first brewing module part and the second brewing module part form
a discharge device for discharging an extraction product from the capsule; and
an injector for introducing an extraction liquid into the capsule;
and wherein the first brewing module part and the second brewing module part form a brewing chamber, wherein the brewing chamber is designed to match the form of the capsule, at least partially surrounds the capsule during the brewing operation, and acts in a sealing manner such that brewing liquid introduced into the capsule by the injector can only reach the side where the discharge device is located by passing through the capsule;

wherein the discharge device and the injector each comprise at least one perforating tip, which perforates the capsule when the brewing chamber is being closed; and, wherein the capsule has a rectangular bottom and the perforating tips are arranged to perforate the rectangular bottom.

2. The system according to claim 1, wherein the capsule, with the exception of the peripheral edge, is cube-shaped.

3. The system according to claim 1, wherein the brewing module is a horizontal brewing module.

4. The system according to claim 1, wherein the capsule wall consists of plastic.

5. The system according to claim 4, wherein the capsule wall consists of polypropylene.

6. The system according to claim 1, wherein the capsule is entirely free from filtering means and other elements arranged between the wall and the extraction material, so that the extraction material can lie directly against each side.

* * * * *